United States Patent
Chabot

(10) Patent No.: US 8,856,197 B2
(45) Date of Patent: Oct. 7, 2014

(54) SYSTEM AND METHOD FOR PROCESSING DATA USING A MATRIX OF PROCESSING UNITS

(75) Inventor: Xavier Chabot, Dublin, CA (US)

(73) Assignee: NXP, B.V., Eindhoven (NL)

( * ) Notice: Subject to any disclaimer, the term of this patent is extended or adjusted under 35 U.S.C. 154(b) by 684 days.

(21) Appl. No.: 13/124,110

(22) PCT Filed: Oct. 9, 2009

(86) PCT No.: PCT/IB2009/054449
§ 371 (c)(1),
(2), (4) Date: Apr. 13, 2011

(87) PCT Pub. No.: WO2010/044033
PCT Pub. Date: Apr. 22, 2010

(65) Prior Publication Data
US 2011/0202587 A1    Aug. 18, 2011

Related U.S. Application Data

(60) Provisional application No. 61/106,022, filed on Oct. 16, 2008.

(51) Int. Cl.
*G06F 7/38*    (2006.01)
*G06F 15/78*   (2006.01)

(52) U.S. Cl.
CPC .................. *G06F 15/7867* (2013.01)
USPC ........................................................ 708/232

(58) Field of Classification Search
CPC .......... H03K 19/177; H03K 19/17708; H03K 19/1736; H03K 19/17704; G06F 7/53
USPC .......................................... 708/230–236, 492
See application file for complete search history.

(56) References Cited

U.S. PATENT DOCUMENTS

| | | |
|---|---|---|
| 5,421,019 A | 5/1995 | Holsztynski et al. |
| 6,255,849 B1 | 7/2001 | Mohan |
| 6,622,242 B1 | 9/2003 | Steele, Jr. |
| 7,127,595 B1 | 10/2006 | Gou |
| 7,237,055 B1 | 6/2007 | Rupp |
| 2003/0014616 A1 | 1/2003 | Makphaibulchoke et al. |
| 2007/0260847 A1 | 11/2007 | Kitaoka et al. |

FOREIGN PATENT DOCUMENTS

WO    2009/133536 A1    11/2009

OTHER PUBLICATIONS

Sankaran, Jagadeesh; "Reed Solomon Decoder: TMS320C64x Implementation"; Texas Instruments; Application Report No. SPRA686 (Dec. 2000).
"Radio Broadcasting Systems — Digital Audio Broadcasting (DAB)"; European Standard; ETSI EN 300 401 V1.4.1 (Jun. 2006).
"PNX1500, PNX1700, PNX0190, and PNX9520 Trimedia/Nexperia Develoment Boards, Software, and Tools"; Momentum Data Systems Retreived From Internet: http://www.mds.com/products/prodcatasp?cat=pnx1500, (Apr. 12, 2011).
International Search Report for Application PCT/IB2009/054449 (Feb. 15, 2010).

*Primary Examiner* — Tan V. Mai

(57) ABSTRACT

A system and method for processing data utilizes a matrix of processing units using an array of commands stored in memory to process input data words to generate output data words, which can be used in various applications.

18 Claims, 16 Drawing Sheets

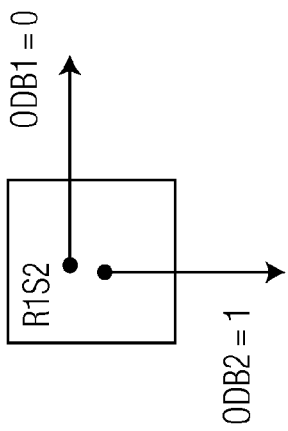
FIG. 5H
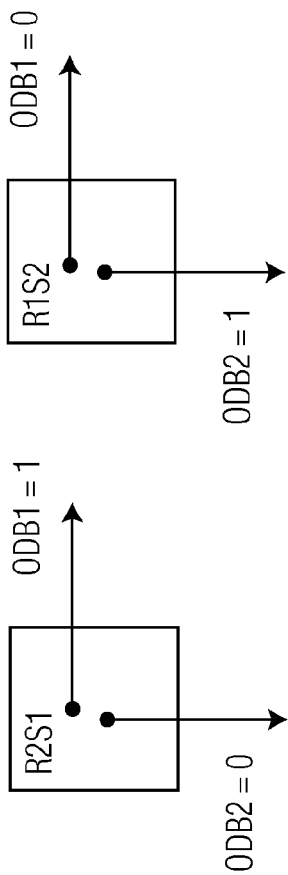
FIG. 5G
FIG. 5F
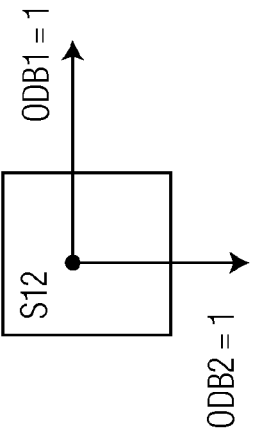
FIG. 5E
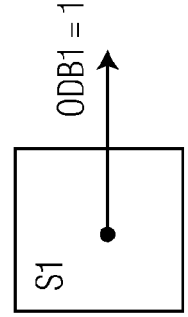

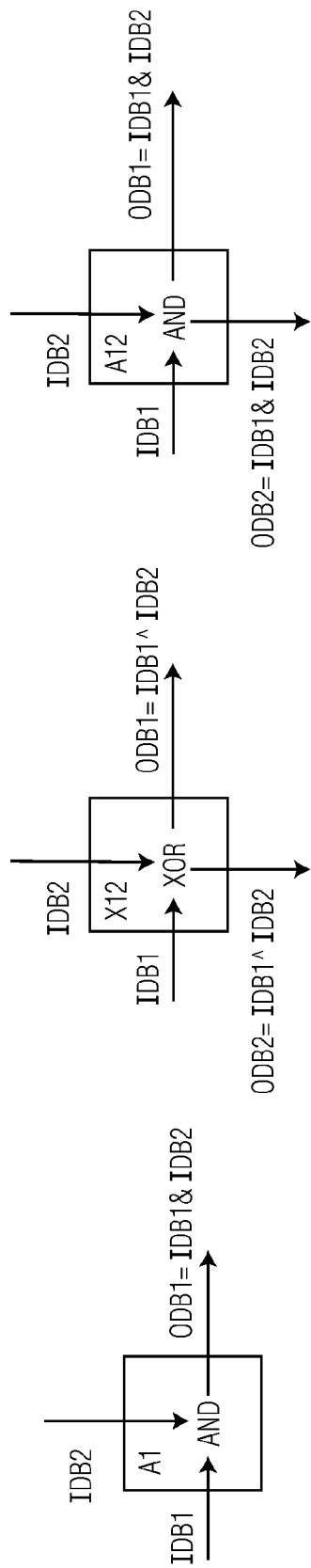

SYSTEM AND METHOD FOR PROCESSING DATA USING A MATRIX OF PROCESSING UNITS

Embodiments of the invention relate generally to electronic systems and, more particularly, to a system and method for processing data.

Processing data, for example, changing the locations of bits in a data word and performing bitwise operations, is important to a variety of electronic systems and applications. In applications such as Fast Fourier Transform (FFT), Single Instruction Multiple Data (SIMD) logic instructions, and Galois field arithmetic operations for Reed Solomon decoders, dedicated hardware is implemented to perform fixed data processing functions, which results in low flexibility and reusability of the dedicated hardware.

Thus, there is a need for a system and method for processing data that improves the flexibility and reusability of dedicated hardware.

A system and method for processing data utilizes a matrix of processing units using an array of commands stored in memory to process input data words to generate output data words, which can be used in various applications.

In an embodiment, a system for processing data comprises a matrix of N rows and M columns of processing units, where N and M are integers greater than zero, memory, and a controller. In the matrix of N rows and M columns of processing units, each processing unit includes at least one logic circuit and each logic circuit is configured to perform a bit operation. The memory is configured to store an array of N rows and M columns of commands, wherein each command of the array of N rows and M columns of commands defines a configuration of the bit operation of one processing unit of the matrix of N rows and M columns of processing units. The controller is configured to control the matrix of N rows and M columns of processing units using the array of N rows and M columns of commands stored in the memory to process at least one input data word having N bits to generate at least one output data word having M bits.

In an embodiment, a method for processing data comprises (a) obtaining an array of N rows and M columns of commands, where N and M are integers greater than zero; (b) applying the array of N rows and M columns of commands to a matrix of N rows and M columns of processing units, wherein each processing unit includes at least one logic circuit and each logic circuit is configured to perform a bit operation, each command of the array of N rows and M columns of commands defining a configuration of the bit operation of one processing unit of the matrix of N rows and M columns of processing units; and (c) at the matrix of N rows and M columns of processing units, performing bit operations on at least one input data word having N bits in response to the array of N rows and M columns of commands to generate at least one output data word having M bits.

In an embodiment, a system for processing data comprises a matrix of processing units, memory, and a controller. The matrix of processing units includes eight rows and eight columns of processing units, wherein each processing unit includes at least one logic circuit and each logic circuit is configured to perform a bit operation. The memory is configured to store an array of eight rows and eight columns of commands, wherein each command of the array of eight rows and eight columns of commands defines a configuration of the bit operation of one processing unit of the matrix of processing units. The controller is configured to control the matrix of processing units using the array of eight rows and eight columns of commands stored in the memory to process at least one input data word having eight bits to generate at least one output data word having eight bits.

Other aspects and advantages of embodiments of the present invention will become apparent from the following detailed description, taken in conjunction with the accompanying drawings, illustrated by way of example of the principles of the invention.

Figure 3:
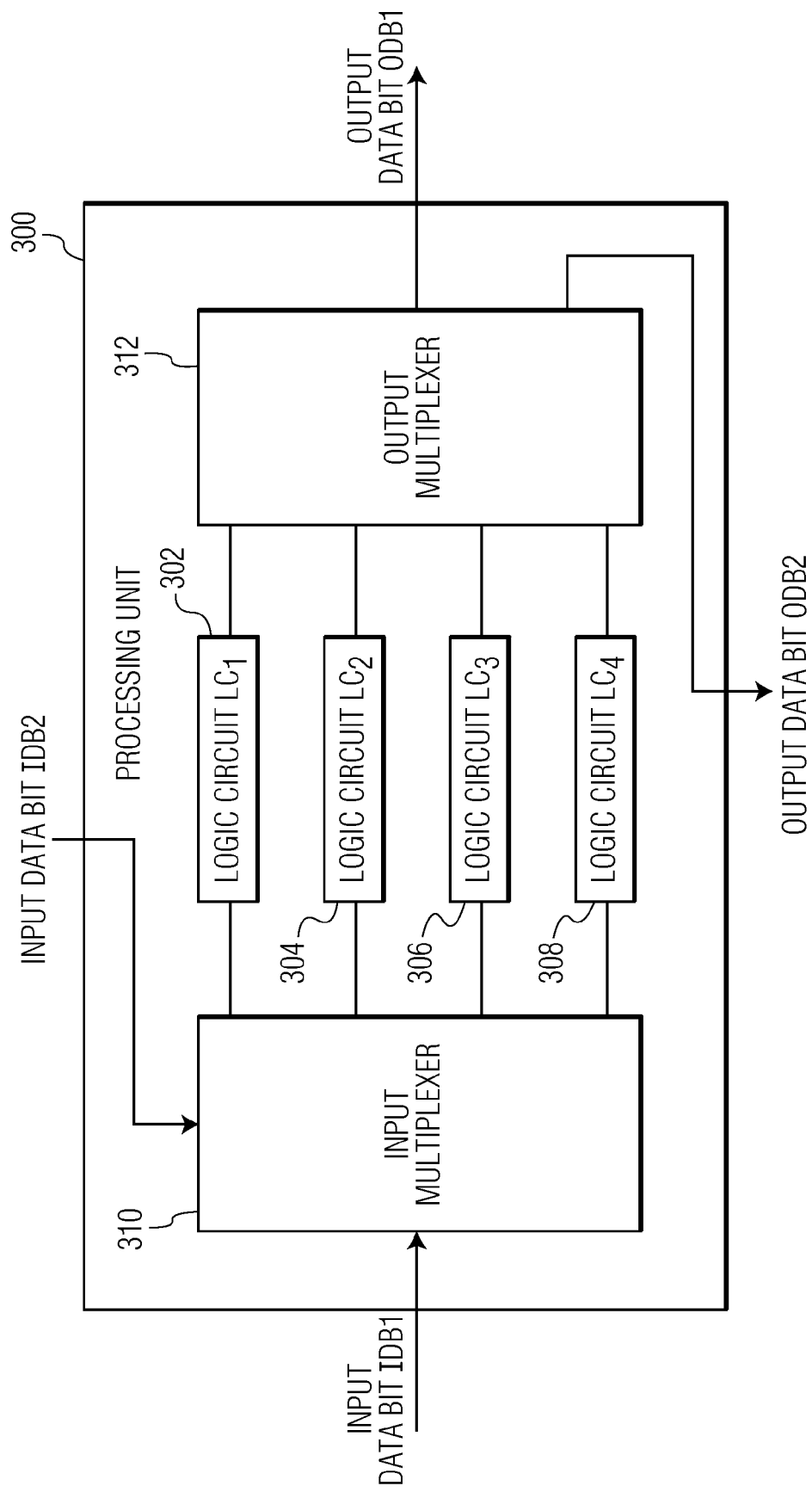
FIG. 3 illustrates an embodiment of a processing unit of the matrix of processing units of FIG. 1.

FIG. 4.A-4.G, FIGS. 5A-5H, FIGS. 6A-6F, FIGS. 7A-7B, and FIG. 8 illustrate some operations that may be performed by the processing unit of FIG. 3.

Figure 2:
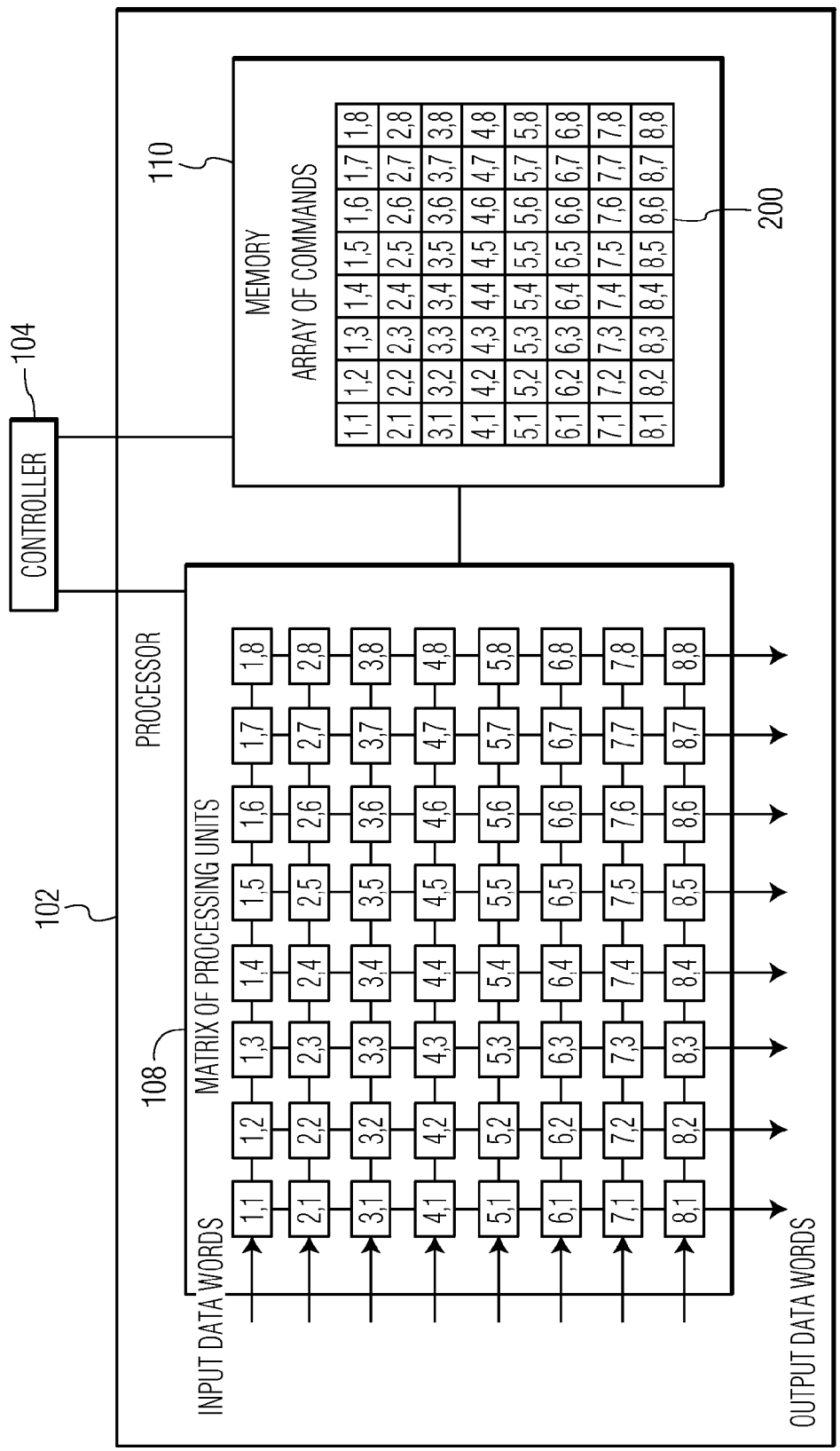
FIG. 2 illustrates an embodiment of a matrix of eight rows and eight columns of processing units and memory to store arrays of eight rows and eight columns of commands in the system of FIG. 1.
Figure 9:
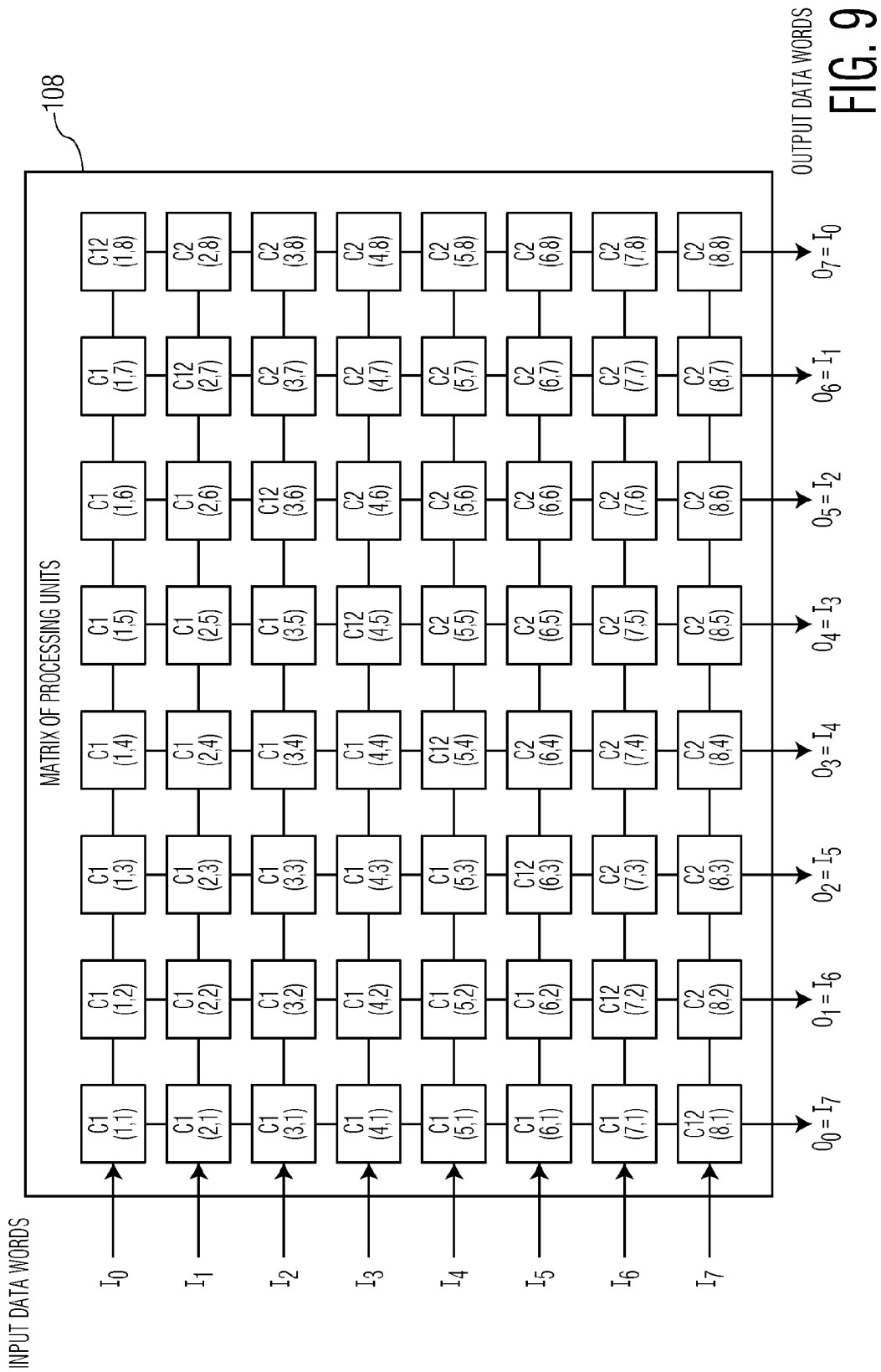

FIG. 9 illustrates an embodiment of bit operations performed according to the array of eight rows and eight columns of commands by the matrix of eight rows and eight columns of processing units of FIG. 2.

Figure 10:
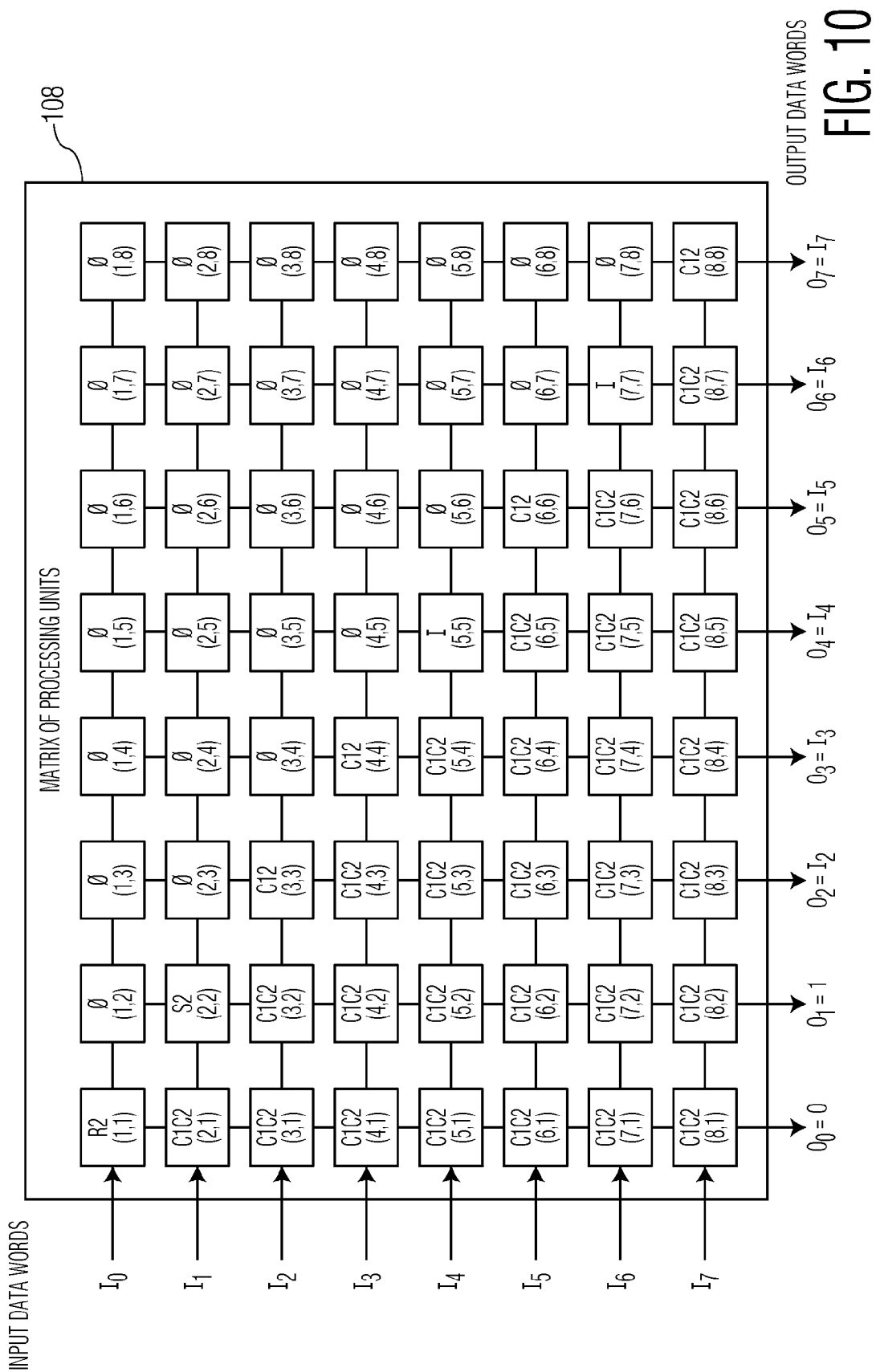

FIG. 10 illustrates another embodiment of bit operations performed according to the array of eight rows and eight columns of commands by the matrix of eight rows and eight columns of processing units of FIG. 2.

Figure 11:
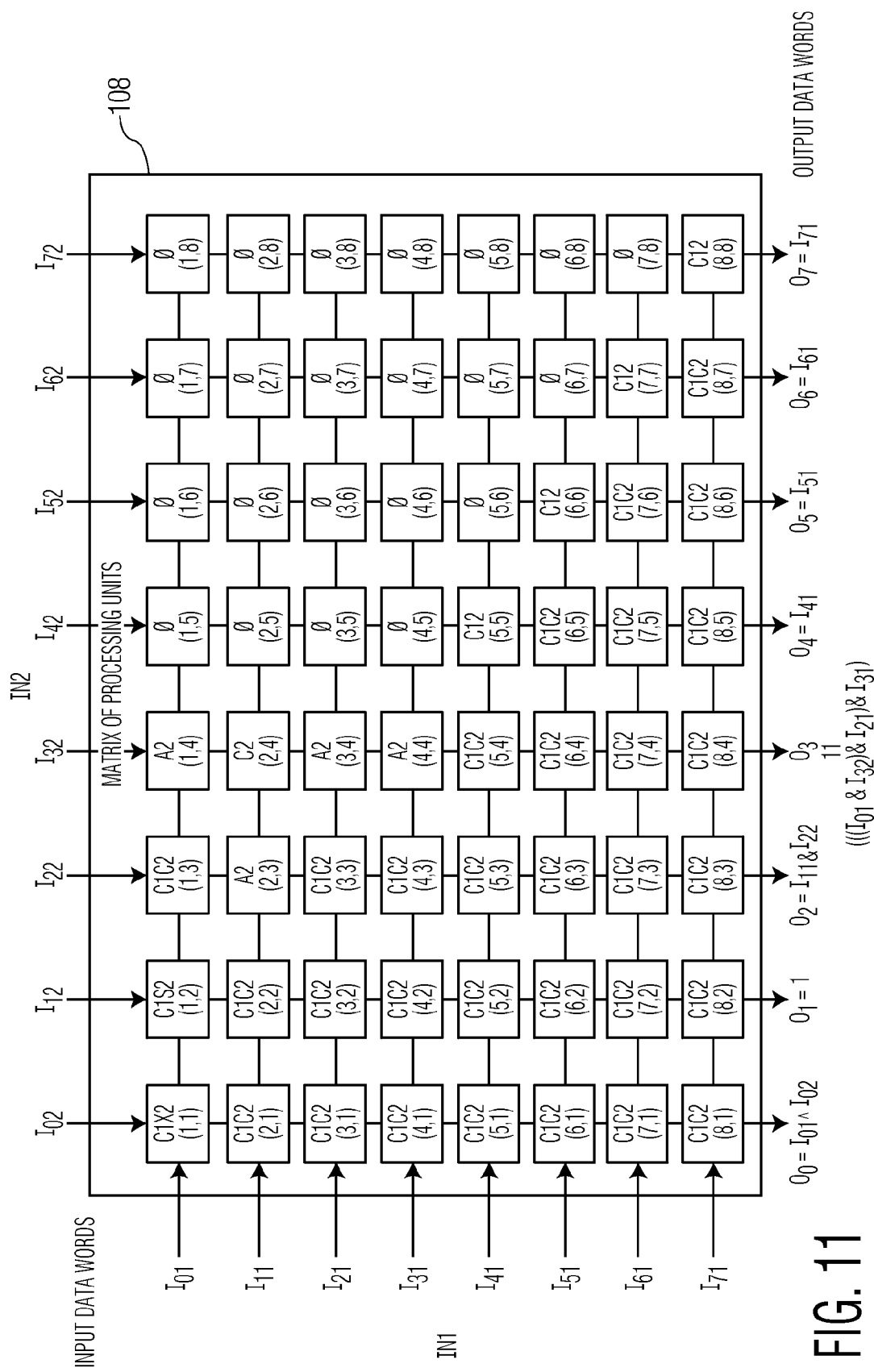

FIG. 11 illustrates another embodiment of bit operations performed according to the array of eight rows and eight columns of commands by the matrix of eight rows and eight columns of processing units of FIG. 2.

Figure 12:
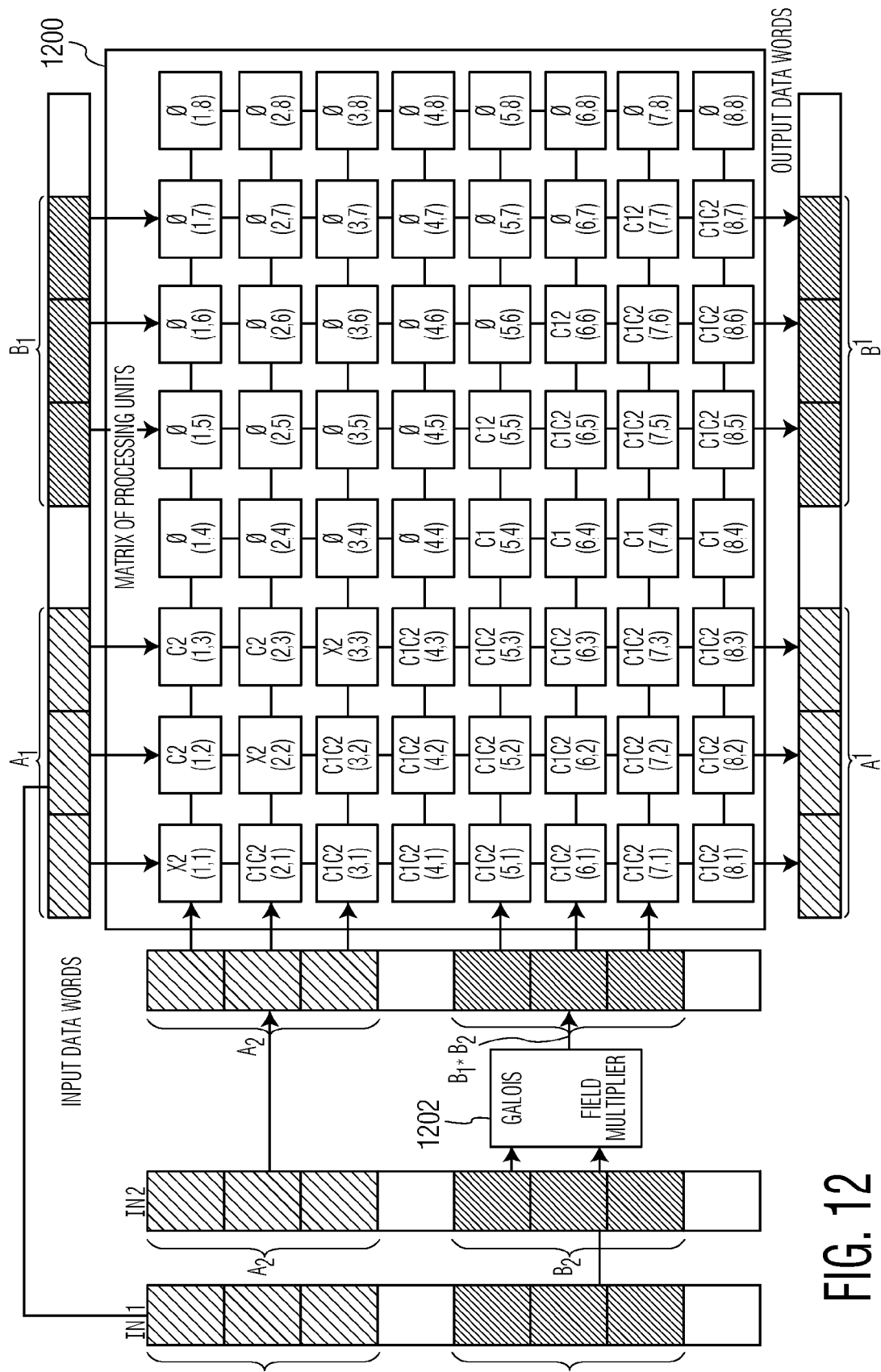

FIG. 12 illustrates bit operations performed according to an array of eight rows and eight columns of commands by a matrix of processing units of eight rows and eight columns of a system for processing data in accordance with another embodiment of the invention.

Figure 13:
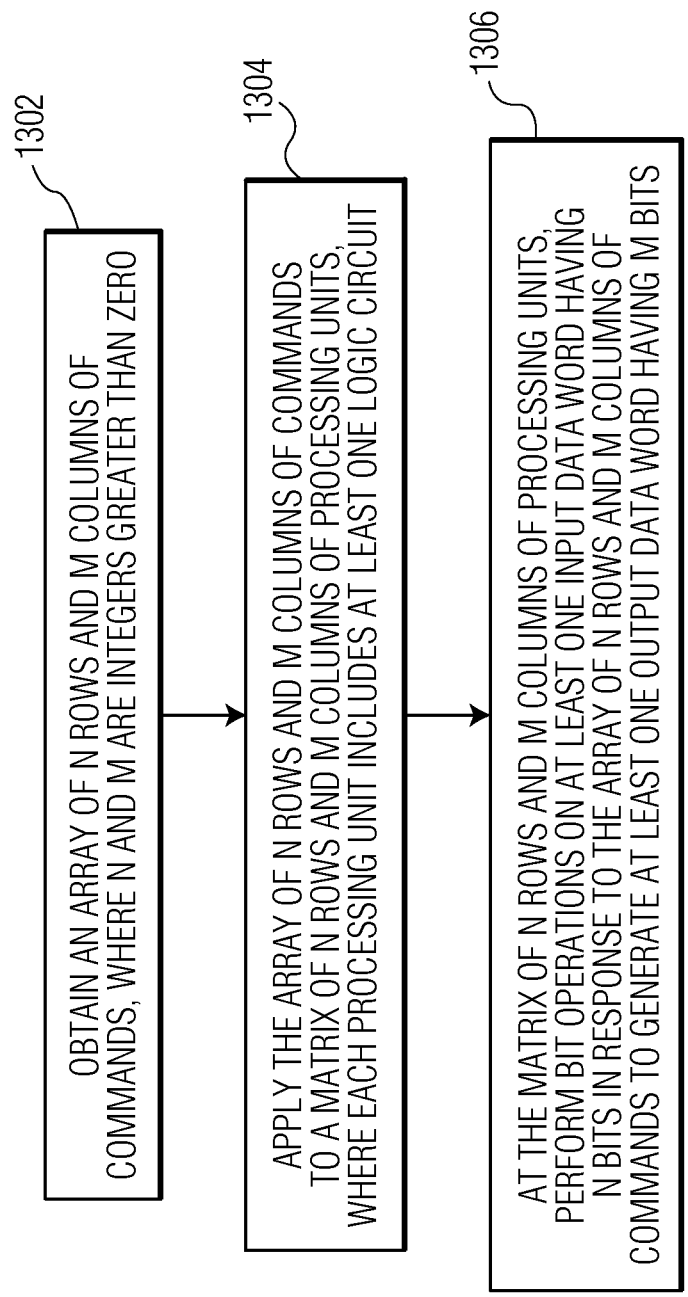

FIG. 13 is a schematic flow chart diagram of a method for processing data in accordance with an embodiment of the invention.

Throughout the description, similar reference numbers may be used to identify similar elements.

Figure 1:
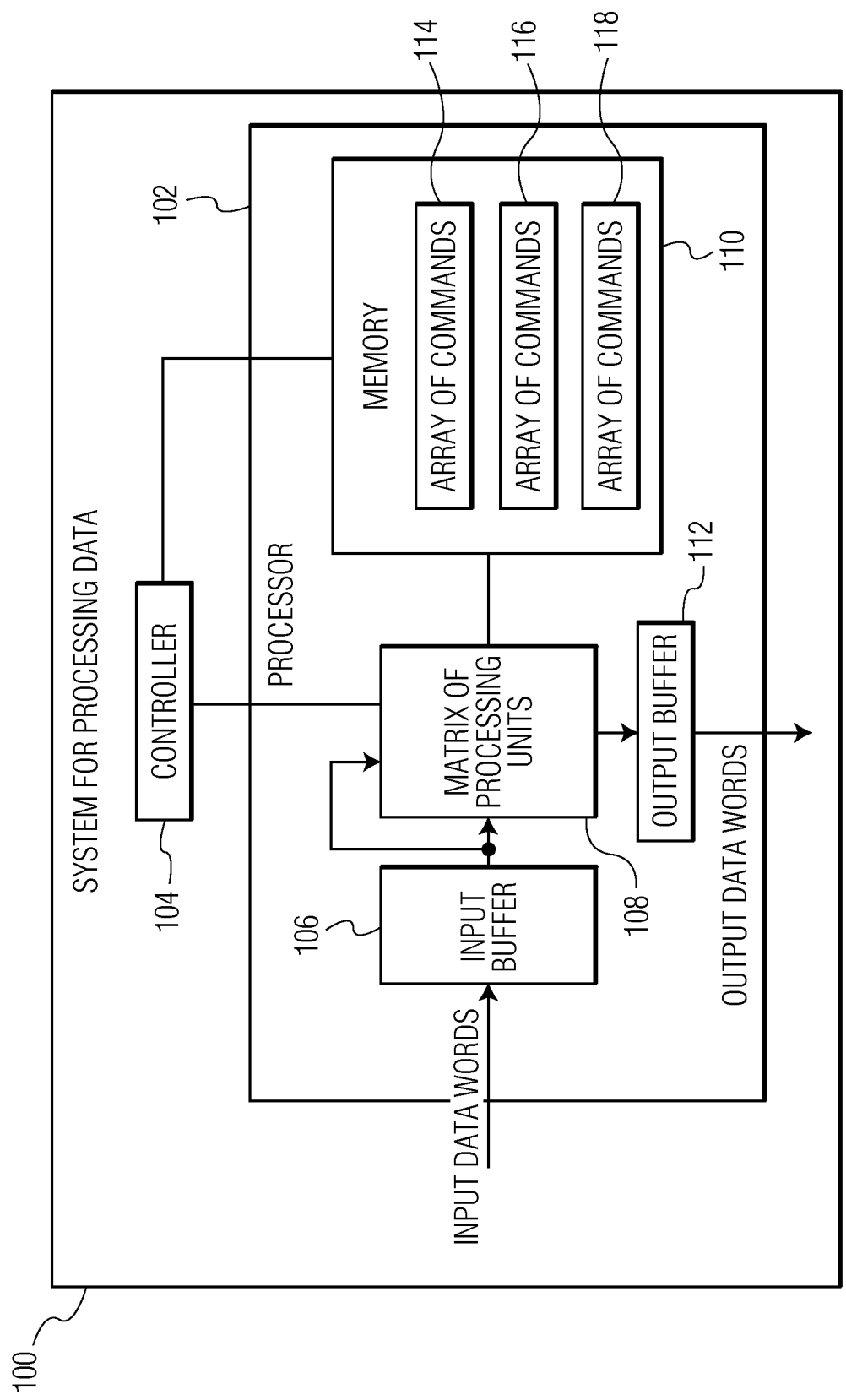
FIG. 1 illustrates a system for processing data in accordance with an embodiment of the invention.

With reference to FIG. 1, a system for processing data 100 in accordance with an embodiment of the invention is described. Embodiments of the system for processing data can be applied to various electronic systems, in particular, spectrum analysis and feature extraction systems, digital communication systems, multimedia audio and video compression systems, and logic and control systems. Example applications of the various electronic systems may include FFT, decision bit compaction in Viterbi decoding, frequency deinterleaving in OFDM-based digital broadcast channel decoding, Galois field arithmetic for Reed-Solomon decoding, encryption, or any applications that use complex masking, shifting, and combining of bits.

As shown in FIG. 1, the system for processing data 100 includes a processor 102, which operates on input data words having N bits to produce output data words having M bits, where N and M are integers greater than zero, and a controller 104, which controls the operation of the processor. In some embodiments, the processor may be a coprocessor. Although the depicted system includes several components described herein, other embodiments may include fewer or more components.

The processor 102 includes an input buffer 106, a matrix of N rows and M columns of processing units 108, memory 110, and an output buffer 112. The input buffer is configured to buffer one or more incoming input data words. The size of the input buffer can vary depending on the size of the input data words. The depth of the input buffer can vary depending on the number of inputs (e.g., one input as in FIG. 9 or two inputs as in FIG. 11). The matrix of N rows and M columns of processing units is configured to perform various bit operations on the input data words to produce the output data words based on a set of commands applied to the matrix of processing units. Thus, by applying different sets of commands, the matrix of processing units can perform different bit operations on the input data words to produce the desired output data words, which can vary depending on the application for which the system 100 is being used. In some embodiments, the number of rows of processing units in the matrix of processing units and the number of columns of processing units in the matrix of processing units are equal, i.e., N=M. In other embodiments, the number of rows of processing units in the matrix of processing units and the number of columns of processing units in the matrix of processing units are not equal, i.e., N≠M. Each processing unit of the matrix of processing units includes at least one logic circuit, where each logic circuit is configured to perform a bit operation. In some embodiments, the processing units are structurally identical to each other. An exemplary processing unit is described in detail below with reference to FIG. 3. The memory is configured to store one or more arrays of commands, where each command of the array of commands defines a configuration of the bit operation of one processing unit of the matrix of processing units. Although three arrays of commands 114, 116, and 118, are shown to be stored in the memory in FIG. 1, the memory may store any number of arrays of commands, which is only limited by the storage capacity of the memory. In an embodiment, each array of commands includes N rows and M column of commands so that each command is used to configure a particular processing unit of the matrix of processing units. The matrix of processing units and the memory are described in more detail below with reference to FIG. 2. The output buffer is configured to buffer the output data words produced by the matrix of processing units. The size of the output buffer can vary depending on the size of the output data words.

The controller 104 is connected to the matrix of processing units 108 and the memory 110 to control the matrix of processing units using arrays of commands stored in the memory to process input data words to generate output data words. As shown in the embodiment of FIG. 1, the controller is separate from the processor 102. However, in other embodiments, the controller may be integrated in the processor. The operation of the controller to control the matrix of processing units using arrays of commands stored in the memory will be described below.

FIG. 2 illustrates an embodiment of the matrix of eight rows and eight columns of processing units 108 and memory 110 in the system 100 of FIG. 1. However, in FIG. 2, the memory is shown with only one array of commands 200. In the illustrated embodiment of FIG. 2, the matrix of processing units includes eight rows and eight columns of processing units and the array of commands includes eight rows and eight columns of commands. In FIG. 2, each of the processing units of the matrix of processing units and each of the commands in the array of commands are indicated with i and j, which represent row and column numbers, respectively, where i is an integer between one and eight and j is an integer between one and eight. Each command (i, j) of the array of commands defines a configuration of the bit operation of a corresponding processing unit (i, j) of the matrix of processing units. For example, the command (1, 1) defines a configuration of the bit operation of the processing unit (1, 1) and the command (8, 8) defines a configuration of the bit operation of the processing unit (8, 8). In this embodiment, the controller 104 controls the matrix of processing units using the array of eight rows and eight columns of commands stored in the memory to process input data words of eight bits to generate output data words of eight bits.

In some embodiments, each processing unit of the matrix of processing units 108 may output its output data bit to other processing unit(s) as an input for the other processing unit(s). In some embodiments, each processing unit may output its output data bit to another processing unit in the same column of the matrix of processing units as an input for that processing unit. For example, the processing unit (1, 1) may output its output data bit to the processing unit (2, 1), which may output its output data bit to the processing unit (3, 1), etc. In some embodiments, each column of the matrix of processing units may execute a corresponding column of the array of commands 200 on an input data word to generate one bit of an output data word. For example, the column of processing units (i, 1) may perform the column of commands (i, 1) on an input data words to generate one bit of an output data word.

In some embodiments, the matrix of processing units 108 may perform the bit operations in a predefined order. In some embodiments, the matrix of processing units may perform the bit operations in an order, which begins from the top row of the processing units from left to right, then goes down each column of the processing units to the next row, where this sequence is repeated until the last row of the processing units. In other words, the matrix of processing units first performs the bit operations horizontally from the processing unit (1, 1) to the processing unit (1, 8), then vertically from the processing units (1, j) to the processing units (2, j). The matrix of processing units then performs the bit operations horizontally from the processing unit (2, 1) to the processing unit (2, 8), then vertically from the processing units (2, j) to the processing units (3, j), and so on until the bit operations are performed horizontally from the processing unit (8, 1) to the processing unit (8, 8).

In operation, the controller 104 may directly load the array of commands 200 stored in the memory 110 into the matrix of processing units 108. In each processing unit of the matrix of processing units, at least one of the logic circuits of the processing unit configures its bit operation according to a command that is received by the processing unit. The matrix of processing units receives input data words from the input buffer 106, performs bit operations on the input data words in the logic circuits of the processing units according to their current configurations, and generates output data words, which are buffered by the output buffer 112. In some embodiments, the controller may directly load one of the arrays of commands stored in the memory into the matrix of processing units according to a schedule. In other embodiments, the controller may directly load one of the arrays of commands stored in the memory into the matrix of processing units in response to an external signal.

Alternatively, the controller 104 may convert the array of commands 200 stored in the memory 110 into control signals and loads the control signals into the matrix of processing units 108. In each processing unit of the matrix of processing units, at least one of the logic circuits of the processing unit configures its bit operation according to a control signal that is received by the processing unit. The matrix of processing units receives input data words from the input buffer 106, performs bit operations on the input data words in the logic circuits of the processing units according to their current configurations, and generates output data words, which are buffered by the output buffer 112. In some embodiments, the controller may convert one of the arrays of commands stored in memory into control signals and load the control signals into the matrix of processing units according to a schedule. In other embodiments, the controller may convert one of the arrays of commands stored in memory into control signals and load the control signals into the matrix of processing units in response to an external control signal.

FIG. 3 illustrates an embodiment of a processing unit 300 of the matrix of processing units 108 of FIG. 1. In the embodiment described with reference to FIG. 3, the processing unit includes four logic circuits $LC_1$ 302, $LC_2$ 304, $LC_3$ 306, and $LC_4$ 308 that are connected to an input multiplexer 310 and an output multiplexer 312. Two input data bits IDB1 and IDB2 are inputted into the input multiplexer and processed by one or more logic circuits of the four logic circuits $LC_1$, $LC_2$, $LC_3$, and $LC_4$. Two output data bits ODB1 and ODB2 are outputted from the output multiplexer. Although the processing unit includes four logic circuits in FIG. 3, the processing unit may include fewer than four logic circuits or more than four logic circuits.

Each logic circuit of the processing unit 300 is configured to perform a bit operation. In the embodiment described with reference to FIG. 3, the logic circuit $LC_1$ 302 performs a bit copy operation to copy the value of an input data bit to an output data bit. The logic circuit $LC_1$ may be implemented by an AND gate with two inputs, the input data bit and a fixed logic value of one. The logic circuit $LC_2$ 304 performs a bit set operation to set the value of the output data bit to one. The logic circuit $LC_2$ may be implemented by an OR gate with two inputs, the input data bit and a fixed logic value of one. The logic circuit $LC_3$ 306 performs a bit reset operation to set the value of the output data bit to zero. The logic circuit $LC_3$ may be implemented by an AND gate with two inputs, the input data bit and a fixed logic value of zero. The logic circuit $LC_4$ 308 performs a bit inverse operation to set the value of the output data bit to the complement of the input data bit. The logic circuit $LC_4$ may be implemented by an XOR gate with two inputs, the input data bit and a fixed logic value of one.

In some embodiments, one or more logic circuits of the processing unit 300 may perform a bit operation other than the bit copy operation, the bit set operation, the bit reset operation and the bit inverse operation described above. In some embodiments, one or more logic circuits of the processing unit may perform a bit operation on more than one input data bits from one or more input data words. For example, a logic circuit of the processing units may perform an Exclusive OR (XOR) operation or an AND operation on input data bits from multiple input data words. In some embodiments, one or more logic circuits of the processing unit may perform a bit operation on only one input data bit of a selected input data word of multiple input data words. In some embodiments, one of the logic circuits of the processing unit may output its output data bit to other logic circuit(s) of the processing unit. Each command of an array of commands stored in memory defines a configuration of the bit operation of the processing unit. In some embodiments, each command enables one logic circuit and disables the other logic circuit(s) of a particular processing unit. As an example, a command for the processing unit may enable the logic circuit $LC_1$ 302 and disable the logic circuits $LC_2$ 304, $LC_3$ 306, and $LC_4$ 308 such that the processing unit is configured to perform the bit copy operation.

FIG. 4A-4G, FIGS. 5A-5H, FIGS. 6A-6F, FIGS. 7A-7B, and FIG. 8 illustrate some operations that may be performed by the processing unit 300 of FIG. 3. However, the operations that may be performed by the processing unit are not limited to these operations.

Figure 4D:
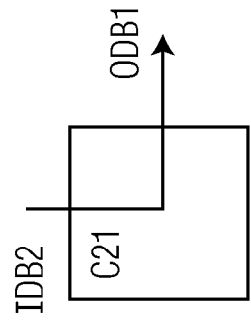
Figure 4C:
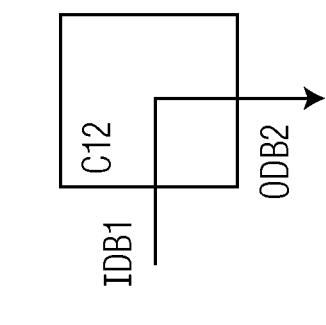
Figure 4B:
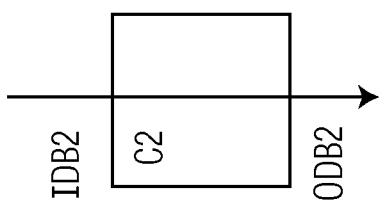
Figure 4A:
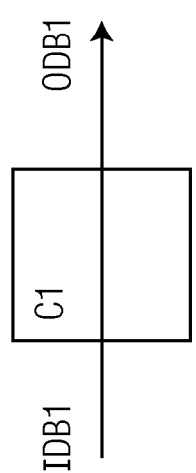
Figure 4E:
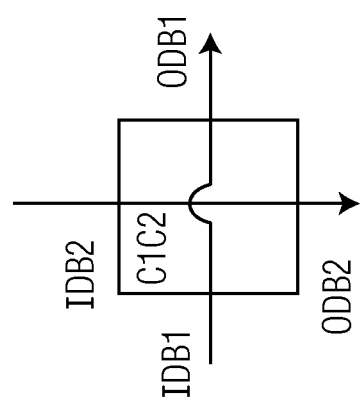
Figure 4F:
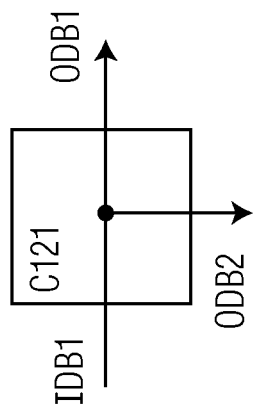
Figure 4G:
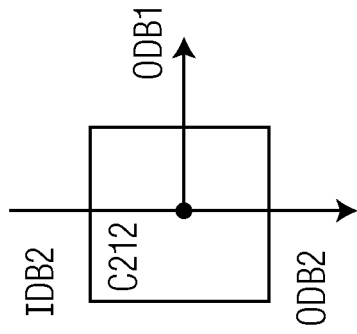

The processing unit 300 may be configured to perform a bit copy operation to copy the values of one or more input data bits to one or more output data bits. FIG. 4A-4G illustrate seven bit copy operations that may be performed by the processing unit. As shown in FIG. 4A, the processing unit performs a bit copy operation C1 to copy the value of the input data bit IDB1 to the output data bit ODB1. As shown in FIG. 4B, the processing unit performs a bit copy operation C2 to copy the value of the input data bit IDB2 to the output data bit ODB2. As shown in FIG. 4C, the processing unit performs a bit copy operation C12 to copy the value of the input data bit IDB1 to the output data bit ODB2. As shown in FIG. 4D, the processing unit performs a bit copy operation C21 to copy the value of the input data bit IDB2 to the output data bit ODB1. As shown in FIG. 4E, the processing unit performs a bit copy operation C1C2 to copy the value of the input data bit IDB1 to the output data bit ODB1 and the value of the input data bit IDB2 to the output data bit ODB2. As shown in FIG. 4F, the processing unit performs a bit copy operation C121 to copy the value of the input data bit IDB1 to the output data bit ODB1 and the output data bit ODB2. As shown in FIG. 4G, the processing unit performs a bit copy operation C212 to copy the value of the input data bit IDB2 to the output data bit ODB1 and the output data bit ODB2.

Figure 5D:
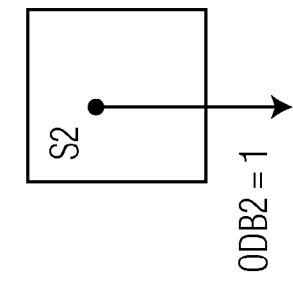
Figure 5C:
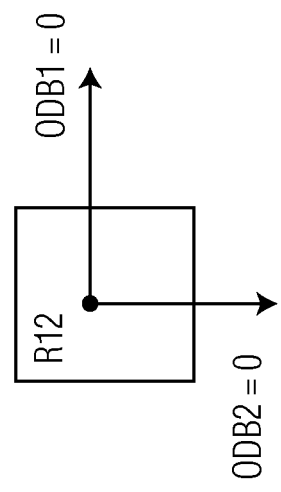
Figure 5B:
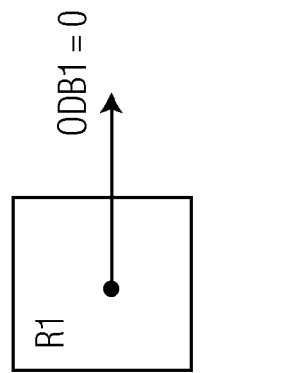
Figure 5A:
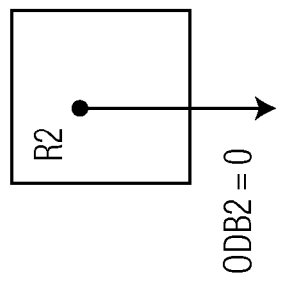

The processing unit 300 may be configured to perform a bit set/reset operation to set the values of one or more output data bits to one or zero. FIGS. 5A-5H illustrate eight bit set/reset operations that may be performed by the processing unit. As shown in FIG. 5A, the processing unit performs a bit reset operation R2 to reset the value of output data bit ODB2 to zero. As shown in FIG. 5B, the processing unit performs a bit reset operation R1 to reset the value of output data bit ODB1 to zero. As shown in FIG. 5C, the processing unit performs a bit reset operation R12 to reset the values of output data bits ODB1 and ODB2 to zero. As shown in FIG. 5D, the processing unit performs a bit set operation S2 to set the value of output data bit ODB2 to one. As shown in FIG. 5E, the processing unit performs a bit set operation S1 to set the value of output data bit ODB1 to one. As shown in FIG. 5F, the processing unit performs a bit set operation S12 to set the values of output data bits ODB1 and ODB2 to one. As shown in FIG. 5G, the processing unit performs a bit set operation R2S1 to reset the value of output data bit ODB2 to zero and the value of output data bit ODB1 to one. As shown in FIG. 5H, the processing unit performs a bit set operation R1S2 to reset the value of output data bit ODB1 to zero and to set the value of output data bit ODB2 to one.

Figure 6C:
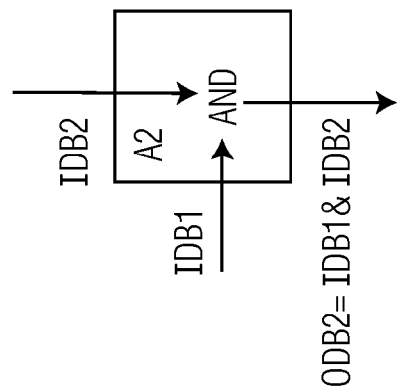
Figure 6B:
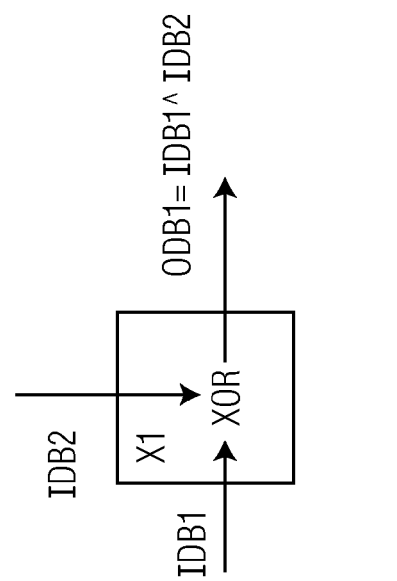
Figure 6A:
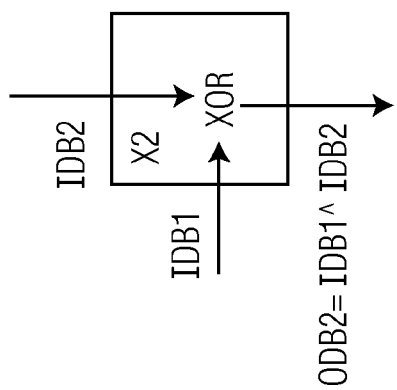

The processing unit 300 may be configured to perform a bit logic operation, for example, a bit inverse operation Ito set the value of the output data bit to the complement of the input data bit. FIGS. 6A-6F illustrate six bit logic operations that may be performed by the processing unit. As shown in FIG. 6A, the processing unit performs a bit logic operation X2 to set the value of the output data bit ODB2 to the logic XOR result of the input data bits IDB1 and IDB2. As shown in FIG. 6B, the processing unit performs a bit logic operation X1 to set the value of the output data bit ODB1 to the logic XOR result of the input data bits IDB1 and IDB2. As shown in FIG. 6C, the processing unit performs a bit logic operation A2 to set the value of the output data bit ODB2 to the logic AND result of the input data bits IDB1 and IDB2. As shown in FIG. 6D, the processing unit performs a bit logic operation A1 to set the value of the output data bit ODB1 to the logic AND result of the input data bits IDB1 and IDB2. As shown in FIG. 6E, the processing unit performs a bit logic operation X12 to set the values of the output data bits ODB1 and ODB2 to the logic XOR result of the input data bits IDB1 and IDB2. As shown in FIG. 6F, the processing unit performs a bit logic operation A12 to set the values of the output data bits ODB1 and ODB2 to the logic AND result of the input data bits IDB1 and IDB2.

Figure 7B:
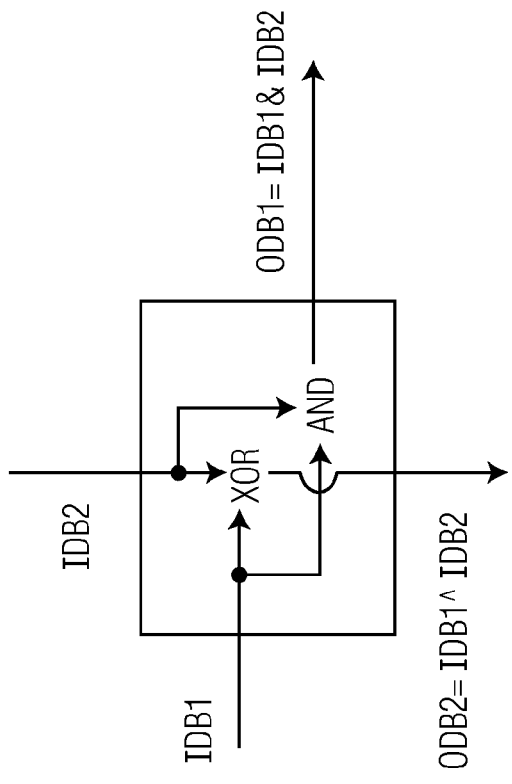
Figure 7A:
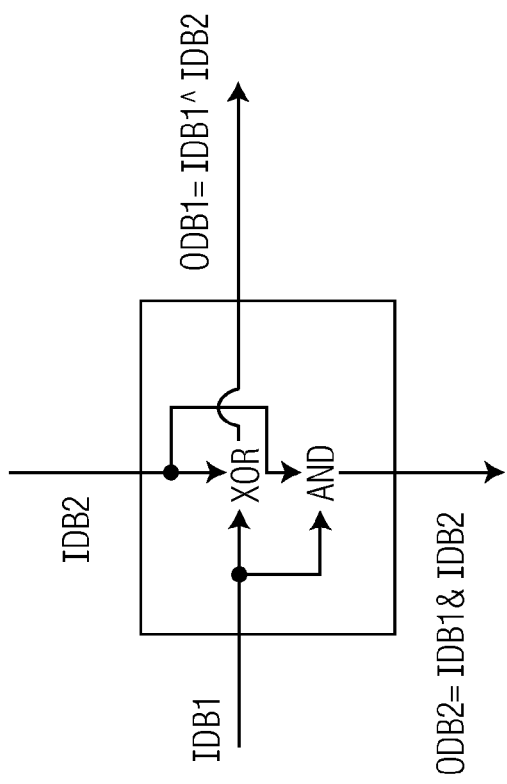
Figure 8:
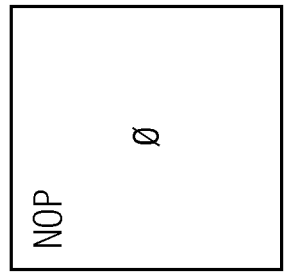

In some embodiments, the processing unit 300 may be configured to perform a bit operation other than the bit copy operations, the bit set/reset operations and the bit logic operations described above on one or more input data bits. In some embodiments, the processing unit may perform a combination of one or more bit copy operations, one or more bit set/reset operations, and/or one or more bit logic operations described above on one or more input data bits. In some embodiments, the processing unit may perform a bit operation on one of the two input data bits and another bit logic operation on the other input data bit. FIGS. 7A-7B illustrate two combinations of bit operations that may be performed by the processing unit. Other embodiments may include any other combination of logic operations that takes two one-bit inputs and results in two one-bit outputs. As shown in FIG. 7A, the processing unit performs the bit logic operation X1 to set the value of the output data bit ODB1 to the logic XOR result of the input data bits IDB1 and IDB2 and the bit logic operation A2 to set the value of the output data bit ODB2 to the logic AND result of the input data bits IDB1 and IDB2. As shown in FIG. 7B, the processing unit performs the bit logic operation A1 to set the value of the output data bit ODB1 to the logic AND result of the input data bits IDB1 and IDB2 and the bit logic operation X2 to set the value of the output data bit ODB2 to the logic XOR result of the input data bits IDB1 and IDB2. In some embodiments, the processing unit may not perform any bit operation. For example, as shown in FIG. 8, the processing unit may be in a pass-through mode ø, where the processing unit performs no operation ("NOP").

Turning now FIG. 9, an embodiment of bit operations performed according to the array of eight rows and eight columns of commands 200 by the matrix of eight rows and eight columns of processing units 108 of FIG. 2 is illustrated. In this embodiment, the matrix of eight rows and eight columns of processing units receives input data words, which have eight bits $I_0$-$I_7$, and processes the input data words according to the configurations of bit operations of the processing units, as defined by the array of eight rows and eight columns of commands, to generate output data words, which have eight bits $O_0$-$O_7$.

As shown in FIG. 9, each of the processing units (1, 1)-(1, 7), (2, 1)-(2, 6), (3, 1)-(3, 5), (4, 1)-(4, 4), (5, 1)-(5, 3), (6, 1)-(6, 2) and (7, 1) is configured to perform the bit copy operation C1 described above, as defined by the corresponding commands (1, 1)-(1, 7), (2, 1)-(2, 6), (3, 1)-(3, 5), (4, 1)-(4, 4), (5, 1)-(5, 3), (6, 1)-(6, 2) and (7, 1) in the array of commands 200. Each of the processing units (1, 8), (2, 7), (3, 6), (4, 5), (5, 4), (6, 3), (7, 2) and (8, 1) is configured to perform the bit copy operation C12 described above, as defined by the corresponding commands (1, 8), (2, 7), (3, 6), (4, 5), (5, 4), (6, 3), (7, 2) and (8, 1) in the array of commands. Each of the processing units (2, 8), (3, 7)-(3, 8), (4, 6)-(4, 8), (5, 5)-(5, 8), (6, 4)-(6, 8), (7, 3)-(7, 8), and (8, 2)-(8, 8) is configured to perform the bit copy operation C2 described above, as defined by the corresponding commands (2, 8), (3, 7)-(3, 8), (4, 6)-(4, 8), (5, 5)-(5, 8), (6, 4)-(6, 8), (7, 3)-(7, 8), and (8, 2)-(8, 8) in the array of commands After the bit operations performed by the processing units, the value of output data bit $O_0$ is equal to the value of input data bit $I_7$, the value of output data bit $O_1$ is equal to the value of input data bit $I_6$, the value of output data bit $O_2$ is equal to the value of input data bit $I_5$, the value of output data bit $O_3$ is equal to the value of input data bit $I_4$, the value of output data bit $O_4$ is equal to the value of input data bit $I_3$, the value of output data bit $O_5$ is equal to the value of input data bit $I_2$, the value of output data bit $O_6$ is equal to the value of input data bit $I_1$, and the value of output data bit $O_7$ is equal to the value of input data bit $I_0$. Thus, in this embodiment, the positions of $I_0$-$I_7$ of the input data words have been reversed in the output data words.

FIG. 10 illustrates another embodiment of bit operations performed according to the array of eight rows and eight columns of commands 200 by the matrix of processing units 108 of FIG. 2. In this embodiment, the processing unit (1, 1) is configured to perform the bit reset operation R2 described above, as defined by the corresponding command (1, 1) in the array of commands. The processing unit (2, 2) is configured to perform the bit set operation S2 described above, as defined by the corresponding command (2, 2) in the array of commands. Each of the processing units (1, 2)-(1, 8), (2, 3)-(2, 8), (3, 4)-(3, 8), (4, 5)-(4, 8), (5, 6)-(5, 8), (6, 7)-(6, 8), and (7, 8) is configured to be in the pass-through mode ø described above, as defined by the corresponding commands (1, 2)-(1, 8), (2, 3)-(2, 8), (3, 4)-(3, 8), (4, 5)-(4, 8), (5, 6)-(5, 8), (6, 7)-(6, 8), and (7, 8) in the array of commands 200. Each of the processing units (2, 1), (3,1)-(3, 2), (4, 1)-(4, 3), (5, 1)-(5, 4), (6, 1)-(6, 5), (7, 1)-(7, 6), and (8, 1)-(8, 7) is configured to perform the bit copy operation C1C2 described above, as defined by the corresponding commands (2, 1), (3,1)-(3, 2), (4, 1)-(4, 3), (5, 1)-(5, 4), (6, 1)-(6, 5), (7, 1)-(7, 6), and (8, 1)-(8, 7) in the array of commands Each of the processing units (3, 3), (4, 4), (6, 6), and (8, 8) is configured to perform the bit copy operation C12 described above, as defined by the corresponding commands (3, 3), (4, 4), (6, 6), and (8, 8) in the array of commands Each of the processing units (5, 5) and (7, 7) is configured to perform the bit inverse operation I described above, as defined by the corresponding commands (5, 5) and (7, 7) in the array of commands. After the bit operations performed by the processing units, the value of output data bit $O_0$ is reset to zero, the value of output data bit $O_1$ is set to one, the value of output data bit $O_2$ is equal to the value of input data bit $I_2$, the value of output data bit $O_3$ is equal to the value of input data bit $I_3$, the value of output data bit $O_4$ is equal to the complement of input data bit $I_4$, the value of output data bit $O_5$ is equal to the value of input data bit $I_5$, the value of output data bit $O_6$ is equal to the complement of input data bit $I_6$, and the value of output data bit $O_7$ is equal to the value of input data bit $I_7$.

FIG. 11 illustrates another embodiment of bit operations performed according to the array of eight rows and eight columns of commands 200 by the matrix of processing units 108 of FIG. 2. In this embodiment, the matrix of eight rows and eight columns of processing units receive two input data words IN1 and IN2, where the input data word IN1 has eight bits $I_{01}$-$I_{71}$ and the input data word IN2 has eight bits $I_{02}$-$I_{72}$. The matrix of eight rows and eight columns of processing units process the two input data words according to the configurations of bit operations, as defined by the array of eight rows and eight columns of commands, to generate output data words, which have eight bits $O_0$-$O_7$.

As shown in FIG. 11, the processing unit (1, 1) is configured to perform a combination of bit operations C1X2, as defined by the corresponding command (1, 1) in the array of commands. The processing unit (1, 2) is configured to perform a combination of bit operations C1S2, as defined by the corresponding command (1, 2) in the array of commands. Each of the processing units (1, 5)-(1, 8), (2, 5)-(2, 8), (3, 5)-(3, 8), (4, 5)-(4, 8), (5, 6)-(5, 8), (6, 7)-(6, 8), and (7, 8) is configured to be in the pass-through mode ø described above, as defined by the corresponding commands (1, 5)-(1, 8), (2, 5)-(2, 8), (3, 5)-(3, 8), (4, 5)-(4, 8), (5, 6)-(5, 8), (6, 7)-(6, 8), and (7, 8) in the array of commands 200. Each of the processing units (1, 3), (2, 1)-(2, 2), (3, 1)-(3, 3), (4, 1)-(4, 3), (5, 1)-(5, 4), (6, 1)-(6, 5), (7, 1)-(7, 6), and (8, 1)-(8, 7) is configured to perform the bit copy operation C1C2 described above, as defined by the corresponding commands (1, 3), (2, 1)-(2, 2), (3, 1)-(3, 3), (4, 1)-(4, 3), (5, 1)-(5, 4), (6, 1)-(6, 5), (7, 1)-(7, 6), and (8, 1)-(8, 7) in the array of commands. Each of the processing units (5, 5), (6, 6), (7, 7), and (8, 8) is configured to perform the bit copy operation C12 described above, as defined by the corresponding commands (5, 5), (6, 6), (7, 7), and (8, 8) in the array of commands. Each of the processing units (1, 4), (2, 3), (3, 4) and (4, 4) is configured to perform the bit inverse operation A2 described above, as defined by the corresponding commands (1, 4), (2, 3), (3, 4) and (4, 4) in the array of commands. After the bit operations performed by the processing units, the value of output data bit $O_0$ is equal to the result of $I_{01}$ XOR $I_{02}$, the output data bit $O_1$ is set to one, the value of output data bit $O_2$ is equal to the result of $I_{11}$ AND $I_{22}$, the value of output data bit $O_3$ is equal to the result of $(((I_{01}$ AND $I_{32})$ AND $I_{21})$ AND $I_{31})$, the value of output data bit $O_4$ is equal to the value of input data bit $I_{41}$, the value of output data bit $O_5$ is equal to the value of input data bit $I_{51}$, the value of output data bit $O_6$ is equal to the value of input data bit $I_{61}$, and the value of output data bit $O_7$ is equal to the value of input data bit $I_{71}$.

FIG. 12 illustrates bit operations performed according to an array of eight rows and eight columns of commands by a matrix of processing units of eight rows and eight columns 1200 of a system for processing data in accordance with another embodiment of the invention. The system is similar to the system 100 of FIG. 1 except for the addition of a Galois field multiplier 1202, which receives input data bits and produces Galois Field multiplication results that are transmitted to the matrix of processing units. In this embodiment, the matrix of eight rows and eight columns of processing units receive two input data words IN1 and IN2. The input data word IN1 has eight bits and two field elements $A_1$ and $B_1$, where each field element includes three bits. The input data word IN2 also has eight bits and two field elements $A_2$ and $B_2$, where each field element includes three bits. The Galois field multiplier is positioned in front of the matrix of eight rows and eight columns of processing units and initialized with an appropriate field size and a primitive polynomial. The Galois field multiplier produces Galois Field multiplication results B1*B2 from the field element $B_1$ of the input data word IN1 and the field element $B_2$ of the input data word IN2. The Galois Field multiplication results B1*B2 are then applied to the matrix of eight rows and eight columns of processing units. The matrix of eight rows and eight columns of processing units process the bits in the field elements $A_1$ and $A_2$, of the two input data words IN1 and IN2 and the resulting bits B1*B2 from the Galois field multiplier according to the configurations of bit operations, as defined by the array of eight rows and eight columns of commands, to generate output data words, which have eight bits and two field elements A' and B', where each field element includes three bits.

As shown in FIG. 12, each of the processing units (1, 1), (2, 2), and (3, 3) is configured to perform the bit inverse operation X2 described above on an input data bit from each of the field element $A_1$ of the input data word IN1 and the field element $A_2$ of the input data word IN2, as defined by the corresponding commands (1, 1), (2, 2), and (3, 3) in the array of commands Each of the processing units (1, 2), (1, 3), and (2, 3) is configured to perform the bit inverse operation C2 described above, as defined by the corresponding commands (1, 2), (1, 3), and (2, 3) in the array of commands. Each of the processing units (1, 4)-(1, 8), (2, 4)-(2, 8), (3, 4)-(3, 8), (4, 4)-(4, 8), (5, 6)-(5, 8), (6, 7)-(6, 8), (7, 8), and (8, 8) is configured to be in the pass-through mode ø described above, as defined by the corresponding commands (1, 4)-(1, 8), (2, 4)-(2, 8), (3, 4)-(3, 8), (4, 4)-(4, 8), (5, 6)-(5, 8), (6, 7)-(6, 8), (7, 8), and (8, 8) in the array of commands. Each of the processing units (2, 1), (3, 1)-(3, 2), (4, 1)-(4, 3), (5, 1)-(5, 3), (6, 1)-(6, 3), (6, 5) (7, 1)-(7, 3), (7, 5)-(7, 6), (8, 1)-(8, 3), and (8, 5)-(8, 7) is configured to perform the bit copy operation C1C2 described above, as defined by the corresponding commands (2, 1), (3, 1)-(3, 2), (4, 1)-(4, 3), (5, 1)-(5, 3), (6, 1)-(6, 3), (6, 5) (7, 1)-(7, 3), (7, 5)-(7, 6), (8, 1)-(8, 3), and (8, 5)-(8, 7) in the array of commands. Each of the processing units (5, 5), (6, 6), and (7, 7) is configured to perform the bit copy operation C12 described above on one of the resulting bits B1*B2 from the Galois Field multiplier 1202, as defined by the corresponding commands (5, 5), (6, 6), and (7, 7) in the array of commands. Each of the processing units (5, 4), (6, 4), (7, 4) and (8, 4) is configured to perform the bit inverse operation C1 described above, as defined by the corresponding commands (5, 4), (6, 4), (7, 4) and (8, 4) in the array of commands. Thus, the field element A' of the output data words is derive from the X2 operation of the bits in the field element $A_1$ of the input data word IN1 and the field element $A_2$ of the input data word IN2. In addition, the field element B' of the output data words is derived from the Galois Field multiplication results of the bits in the field element $B_1$ of the input data word IN1 and the field element $B_2$ of the input data word IN2. The embodiment of FIG. 12 may be used in systems evaluating polynomials on Galois field elements, for example, Reed Solomon decoders.

FIG. 13 is a schematic flow chart diagram of a method for processing data. At block 1302, an array of N rows and M columns of commands is obtained, where N and M are integers greater than zero. At block 1304, the array of N rows and M columns of commands is applied to a matrix of N rows and M columns of processing units, where each processing unit includes at least one logic circuit. Each logic circuit is configured to perform a bit operation, and each command of the array of N rows and M columns of commands defines a configuration of the bit operation of one processing unit of the matrix of N rows and M columns of processing units. At block 1306, at the matrix of N rows and M columns of processing units, bit operations are performed on at least one input data word having N bits in response to the array of N rows and M columns of commands to generate at least one output data word having M bits.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system for processing data, the system comprising:
a matrix of N rows and M columns of processing units, where N and M are integers greater than zero, wherein each processing unit includes at least one logic circuit and each logic circuit is configured to perform a bit operation;
memory configured to store an array of N rows and M columns of commands, wherein each command of the array of N rows and M columns of commands defines a configuration of the bit operation of one processing unit of the matrix of N rows and M columns of processing units;

a controller configured to control the matrix of N rows and M columns of processing units using the array of N rows and M columns of commands stored in the memory to process at least one input data word having N bits to generate at least one output data word having M bits; and wherein the at least one logic circuit includes a first logic circuit configured to performs a bit copy operation to copy a value of one or more input data bits to one or more output data bits, a second logic circuit configured to perform a bit set operation to set values of the one or more output data bits to one, a third logic circuit configured to perform a bit reset operation to set the values of the one or more output data bits to zero, and a fourth logic circuit configured to perform of a bit inverse operation to set the values of one or more output data bits to complements of the values of the one or more input data bits.

2. The system of claim 1, wherein the at least one logic circuit includes a logic circuit configured to perform a bit operation on a plurality of input data bits from a plurality of input data words.

3. The system of claim 1, wherein the at least one logic circuit includes a logic circuit configured to perform a bit operation on only one input data bit of a selected input data word of a plurality of input data words.

4. The system of claim 1, wherein each column of the matrix of N rows and M columns of processing units executes a corresponding column of commands of the array of N rows and M columns of commands on the at least one input data word to generate one bit of the at least one output data word.

5. The system of claim 1, wherein each row of the matrix of N rows and M columns of processing units executes a corresponding row of commands of the array of N rows and M columns of commands on the at least one input data word.

6. The system of claim 1, wherein the controller is configured to directly load the array of N rows and M columns of commands stored in the memory into the matrix of N rows and M columns of processing units.

7. The system of claim 1, wherein the controller is configured to convert the array of N rows and M columns of commands stored in the memory into control signals and to load the control signals into the matrix of N rows and M columns of processing units.

8. The system of claim 1, further comprising a Galois field multiplier configured to perform a Galois field multiplication on the at least one input data word to produce results that are applied to the matrix of processing units.

9. A method for processing data, the method comprising:
obtaining an array of N rows and M columns of commands, where N and M are integers greater than zero;
applying the array of N rows and M columns of commands to a matrix of N rows and M columns of processing units, wherein each processing unit includes at least one logic circuit and each logic circuit is configured to perform a bit operation, each command of the array of N rows and M columns of commands defining a configuration of the bit operation of one processing unit of the matrix of N rows and M columns of processing units;
at the matrix of N rows and M columns of processing units, performing bit operations on at least one input data word having N bits in response to the array of N rows and M columns of commands to generate at least one output data word having M bits; and wherein the performing includes performing a bit copy operation to copy a value of one or more input data bits to one or more output data bits, performing a bit set operation to set values of the one or more output data bits to one, performing a bit reset operation to set the values of the one or more output data bits to zero, and performing a bit inverse operation to set the values of the one or more output data bits to complements of the values of the one or more input data bits at one processing unit of the matrix of N rows and M columns of processing units.

10. The method of claim 9, wherein the performing includes performing a bit operation on a plurality of input data bits from a plurality of input data words at one processing unit of the matrix of N rows and M columns of processing units.

11. The method of claim 9, wherein the performing includes performing a bit operation on only one input data bit of a selected input data word of a plurality of input data words at one processing unit of the matrix of N rows and M columns of processing units.

12. The method of claim 9, wherein the performing includes executing a corresponding column of commands of the array of N rows and M columns of commands at each column of the matrix of N rows and M columns of processing units on the at least one input data word to generate one bit of the at least one output data word.

13. The method of claim 9, wherein the performing includes executing a corresponding row of commands of the array of N rows and M columns of commands at each row of the matrix of N rows and M columns of processing units on the at least one input data word.

14. The method of claim 9, wherein the applying the array of N rows and M columns of commands to a matrix of N rows and M columns of processing units includes directly loading the array of N rows and M columns of commands stored in the memory into the matrix of N rows and M columns of processing units.

15. The method of claim 9, wherein the applying the array of N rows and M columns of commands to a matrix of N rows and M columns of processing units includes converting the array of N rows and M columns of commands stored in the memory into control signals and loading the control signals into the matrix of N rows and M columns of processing units.

16. The method of claim 9, further comprising performing a Galois field multiplication on the at least one input data word to produce results and applying the results to the matrix of processing units.

17. A system for processing data, the system comprising:
a matrix of processing units including eight rows and eight columns of processing units, wherein each processing unit includes at least one logic circuit and each logic circuit is configured to perform a bit operation;
memory configured to store an array of eight rows and eight columns of commands, wherein each command of the array of eight rows and eight columns of commands defines a configuration of the bit operation of one processing unit of the matrix of processing units; and
a controller configured to control the matrix of processing units using the array of eight rows and eight columns of commands stored in the memory to process at least one input data word having eight bits to generate at least one output data word having eight bits; and
wherein the at least one logic circuit includes a first logic circuit configured to performs a bit copy operation to copy a value of one or more input data bits to one or more output data bits, a second logic circuit configured to perform a bit set operation to set values of the one or more output data bits to one, a third logic circuit configured to perform a bit reset operation to set the values of the one or more output data bits to zero, and a fourth logic circuit configured to perform of a bit inverse operation to set the values of one or more output data bits to complements of the values of the one or more input data bits.

18. The system of claim 17, further comprising a Galois field multiplier configured to perform a Galois field multiplication on the at least one input data word to produce results that are applied to the matrix of processing units.

* * * * *